US009739334B2

(12) United States Patent
Ueki et al.

(10) Patent No.: US 9,739,334 B2
(45) Date of Patent: Aug. 22, 2017

(54) VIBRATION DAMPING DEVICE

(71) Applicant: BRIDGESTONE CORPORATION, Tokyo (JP)

(72) Inventors: Akira Ueki, Tokyo (JP); Masakazu Nagasawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/893,170

(22) PCT Filed: May 22, 2014

(86) PCT No.: PCT/JP2014/063582
§ 371 (c)(1),
(2) Date: Nov. 23, 2015

(87) PCT Pub. No.: WO2014/196368
PCT Pub. Date: Dec. 11, 2014

(65) Prior Publication Data
US 2016/0102728 A1   Apr. 14, 2016

(30) Foreign Application Priority Data
Jun. 3, 2013   (JP) .................................. 2013-116890

(51) Int. Cl.
*F16F 13/10*   (2006.01)
*B60K 5/12*    (2006.01)

(52) U.S. Cl.
CPC .......... *F16F 13/107* (2013.01); *B60K 5/1208* (2013.01); *F16F 13/10* (2013.01)

(58) Field of Classification Search
CPC ........ F16F 13/10; F16F 13/107; B60K 5/1208
See application file for complete search history.

(56) References Cited

U.S. PATENT DOCUMENTS

2005/0035508 A1   2/2005   Inoue
2008/0230969 A1   9/2008   Yoshii
(Continued)

FOREIGN PATENT DOCUMENTS

CN   1580605 A   2/2005
EP   2420697 A1   2/2012
(Continued)

OTHER PUBLICATIONS

International Search Report of PCT/JP2014/063582 dated Jul. 1, 2014 [PCT/ISA/210].

*Primary Examiner* — Vishal Sahni
(74) *Attorney, Agent, or Firm* — Sughrue Mion, PLLC

(57) ABSTRACT

A vibration damping device includes a first cylindrical attachment member (11) which is connected to one of a vibration generating portion and a vibration receiving portion, a second attachment member (12) which is connected to the other thereof, an elastic body (13) which connects both attachment members (11 and 12), and a partition member (17) which divides a liquid chamber (14), in which a liquid (L) is sealed and which is positioned within the first attachment member (11), into a primary liquid chamber (15) having the elastic body (13) as a portion of a wall surface, and into a secondary liquid chamber (16). Limiting passages (21 and 22) which communicate with the primary liquid chamber (15) and the secondary liquid chamber (16) are formed in the partition member (17). The limiting passages (21 and 22) include the first limiting passage (21) which generates resonance with respect to input of idle vibration, and the second limiting passage (22) which generates resonance with respect to input of shake vibration. Flow regulation chambers (23 and 24) which communicate with the primary liquid chamber (15) or the secondary liquid chamber (16) and the first limiting passage (21) are provided in the partition member (17). The flow regulation chambers (23

(Continued)

and 24) convert the flow of the liquid (L), which flows into the flow regulation chambers (23 and 24) during the input of shake vibration, into a swirl flow.

14 Claims, 3 Drawing Sheets

(56) References Cited

U.S. PATENT DOCUMENTS

| | | | | |
|---|---|---|---|---|
| 2009/0038896 A1* | 2/2009 | Nishi | ............... | F16F 13/107 |
| | | | | 188/266 |
| 2012/0299229 A1* | 11/2012 | Kubo | ............... | F16F 13/106 |
| | | | | 267/140.13 |

FOREIGN PATENT DOCUMENTS

| JP | 60-73147 A | 4/1985 |
|---|---|---|
| JP | 60-113833 A | 6/1985 |
| JP | 61-101137 U | 6/1986 |
| JP | 62-28543 A | 2/1987 |
| JP | 2007-120598 A | 5/2007 |
| JP | 201071446 A | 4/2010 |

* cited by examiner

VIBRATION DAMPING DEVICE

CROSS REFERENCE TO RELATED APPLICATIONS

This application is a National Stage of International Application No. PCT/JP2014/063582, filed May 22, 2014, claiming priority based on Japanese Patent Application No. 2013-116890, filed Jun. 3, 2013, the contents of all of which are incorporated herein by reference in their entirety.

TECHNICAL FIELD

The present invention relates to a vibration damping device which is applied to an automobile, an industrial machine, or the like, for example, and which absorbs and damps vibrations of a vibration generating portion such as an engine.

BACKGROUND ART

In the related art, as this kind of vibration damping device, for example, a configuration which is described in Patent document 1 is known. The vibration damping device includes a first cylindrical attachment member which is connected to one of a vibration generating portion and a vibration receiving portion, a second attachment member which is connected to the other thereof, an elastic body which connects both attachment members, and a partition member which divides a liquid chamber, in which a liquid is sealed and which is positioned within the first attachment member, into a primary liquid chamber having the elastic body as a portion of a wall surface, and into a secondary liquid chamber. A limiting passage which communicates with the primary liquid chamber and the secondary liquid chamber is formed in the partition member. The limiting passage includes a first limiting passage which generates liquid-column resonance with respect to input of idle vibration, and a second limiting passage which generates liquid-column resonance with respect to input of shake vibration. A plunger member is provided in the partition member.

In the vibration damping device, when vibration is input, the first limiting passage is opened and closed by moving the plunger member. Accordingly, the limiting passage through which a liquid flows is switched between the primary liquid chamber and the secondary liquid chamber. Therefore, when idle vibration is input, the liquid flows through the first limiting passage, and when shake vibration is input, the liquid flows through the second limiting passage.

CITATION LIST

Patent Document

[Patent Document 1] Japanese Unexamined Patent Application, First Publication No. 2007-120598

SUMMARY OF INVENTION

Technical Problem

However, in the vibration damping device of the related art, there is a room for improvement with respect to simplification of a structure and facilitation of manufacturing. The present invention is made in consideration of the above-described circumstances, and an object thereof is to provide a vibration damping device capable of achieving simplification of a structure and facilitation of manufacturing.

Solution to Problem

According to an aspect of the present invention, a vibration damping device includes a first cylindrical attachment member which is connected to one of a vibration generating portion and a vibration receiving portion, and a second attachment member which is connected to the other thereof; an elastic body which connects both attachment members; and a partition member which divides a liquid chamber, in which a liquid is sealed and which is positioned within the first attachment member, into a primary liquid chamber having the elastic body as a portion of a wall surface, and into a secondary liquid chamber; in which a limiting passage which communicates with the primary liquid chamber and the secondary liquid chamber is formed in the partition member; in which the limiting passage includes a first limiting passage which generates resonance with respect to input of idle vibration; and a second limiting passage which generates resonance with respect to input of shake vibration; in which a flow regulation chamber which communicates with the primary liquid chamber or the secondary liquid chamber and the first limiting passage is provided in the partition member, and in which the flow regulation chamber converts the flow of the liquid, which flows into the flow regulation chamber during the input of the shake vibration, into a swirl flow.

Advantageous Effects of Invention

According to a vibration damping device of the present invention, it is possible to achieve simplification of a structure and facilitation of manufacturing.

DESCRIPTION OF EMBODIMENTS

Hereinafter, a vibration damping device according to an embodiment of the present invention will be described with reference to the drawings.

Figure 1:
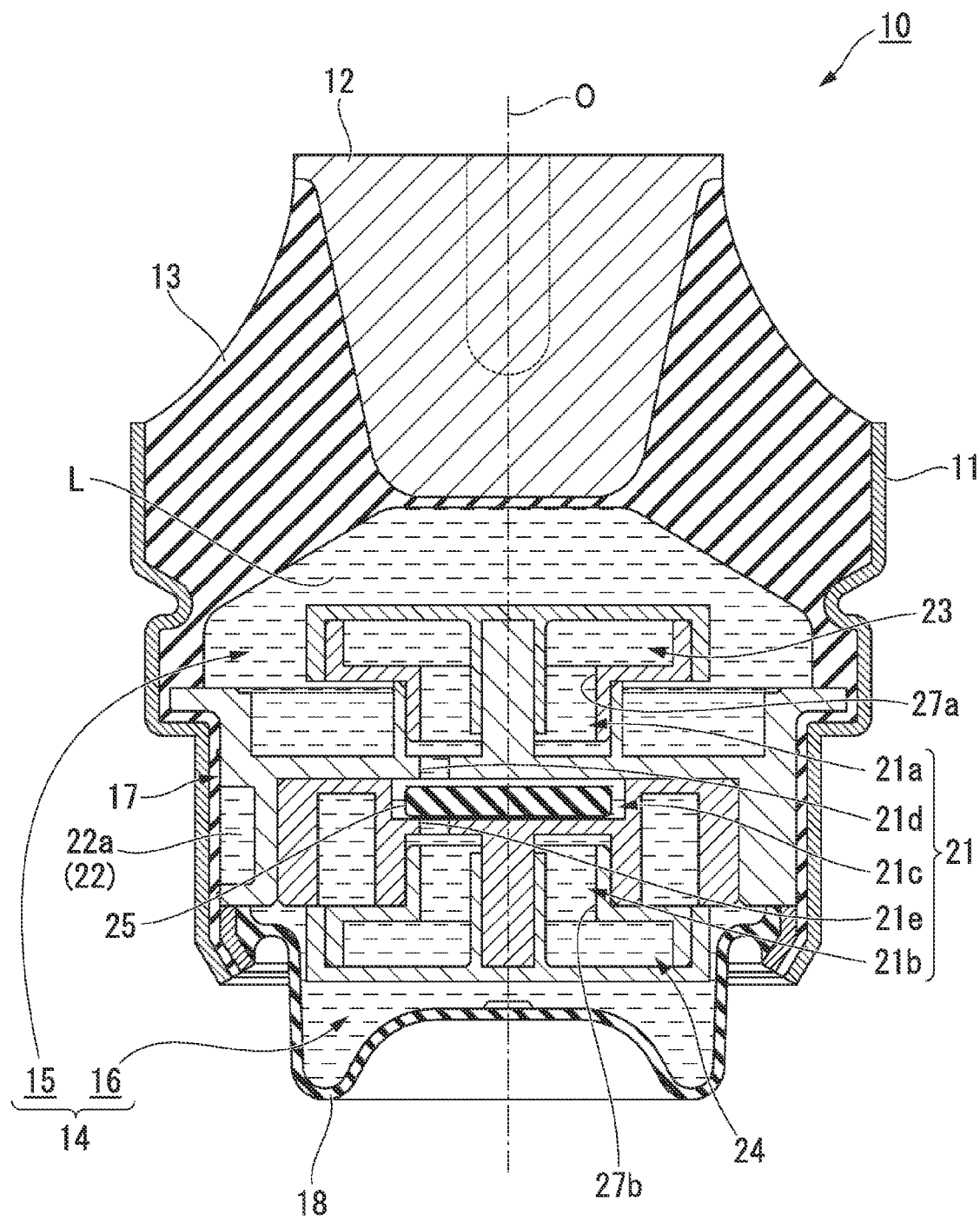
FIG. 1 is a vertical sectional view of a vibration damping device according to an embodiment of the present invention.
Figure 2:
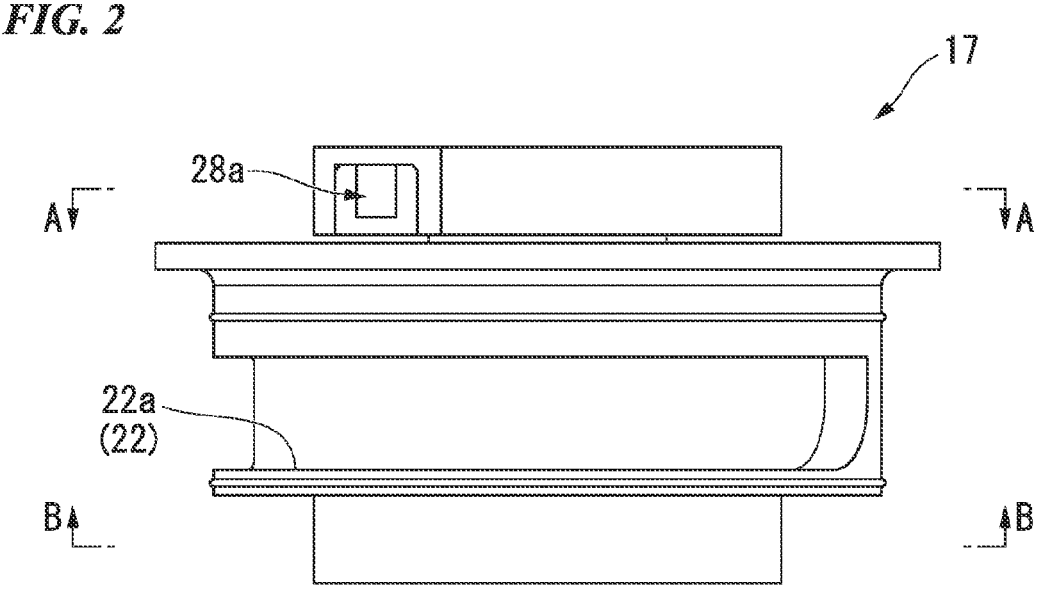
FIG. 2 is a side view of a partition member configuring the vibration damping device shown in FIG. 1.
Figure 3:
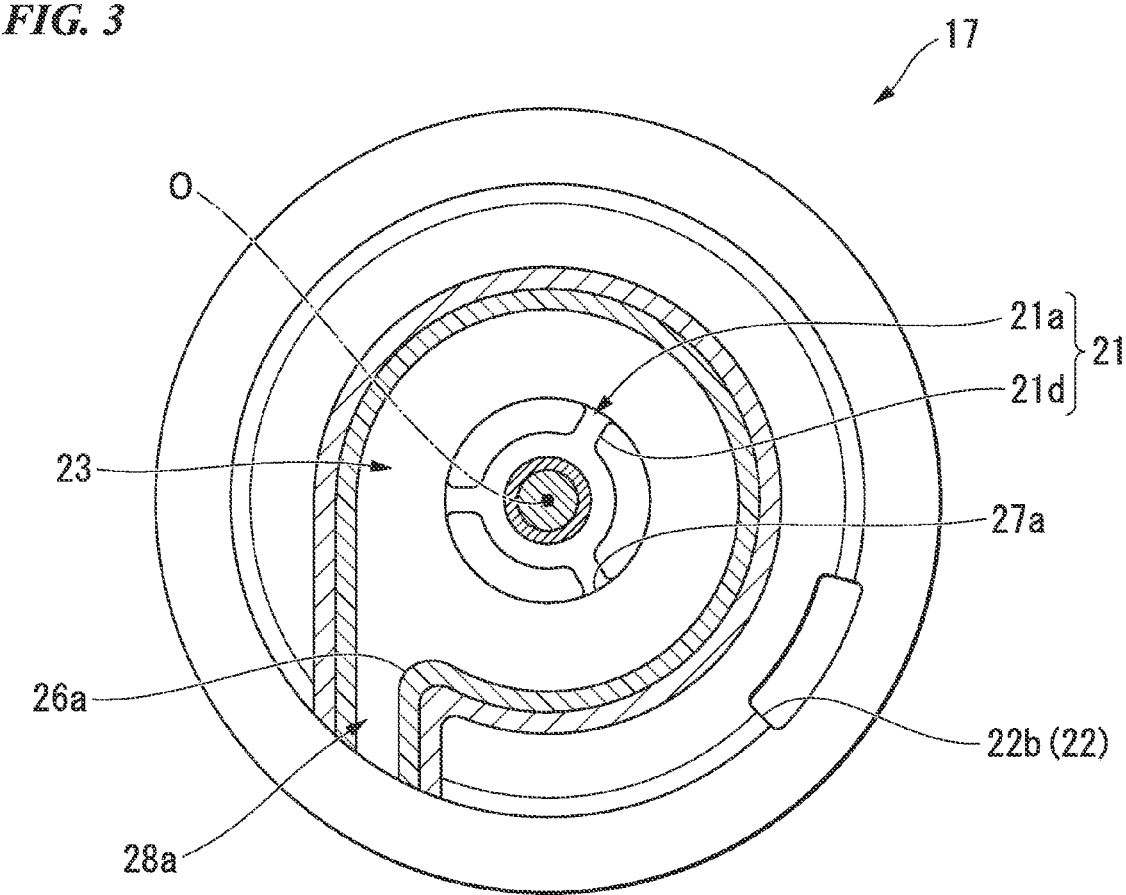
FIG. 3 is a sectional view taken along A-A of the partition member shown in FIG. 2.
Figure 4:
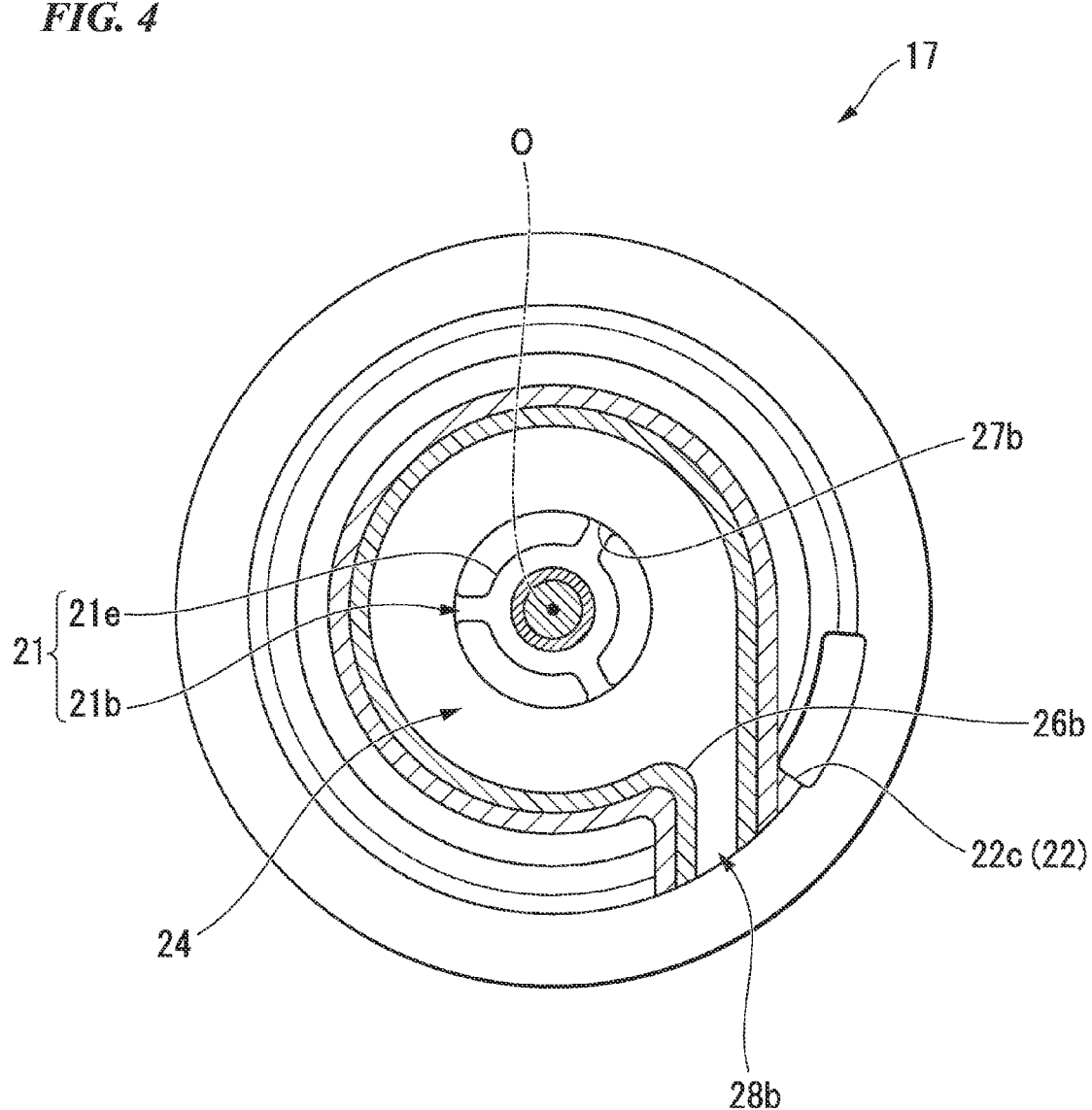
FIG. 4 is a sectional view taken along B-B of the partition member shown in FIG. 2.

As shown in FIG. 1, a vibration damping device 10 includes a first cylindrical attachment member 11 which is connected to one of a vibration generating portion and a vibration receiving portion, a second attachment member 12 which is connected to the other thereof, an elastic body 13 which elastically connects the first attachment member 11 and the second attachment member 12, and a partition member 17 which divides a liquid chamber 14, in which a liquid L is sealed and which is positioned within the first attachment member 11, into a primary liquid chamber 15 of a first side having the elastic body 13 as a portion of a wall surface, and into a secondary liquid chamber 16 of a second side.

For example, when the liquid sealed type vibration damping device 10 is mounted on an automobile, the first attachment member 11 is attached to a vehicle body which is the vibration receiving portion while the second attachment member 12 is connected to an engine which is the vibration generating portion. Accordingly, it is possible to prevent vibration of the engine from being transmitted to the vehicle body. In the vibration damping device 10, a positive pressure acts on the primary liquid chamber 15 based on a support load generated when the vibration damping device 10 is mounted.

The first attachment member 11 is formed in a cylindrical shape, and is formed in a multi-step cylindrical shape in the shown example. Hereinafter, a direction along an axis line O of the first attachment member 11 is referred to as an axial direction, the primary liquid chamber 15 side with respect to the partition member 17 along the axial direction is referred to as a first side in the axial direction, the secondary liquid chamber 16 side with respect to the partition member 17 along the axial direction is referred to as a second side in the axial direction, a direction orthogonal to the axis line O is referred to as a radial direction, and a direction circulating around the axis line is referred to as a circumferential direction.

The second attachment member 12 is disposed on a first end portion positioned on the first side in the axial direction in the first attachment member 11. The second attachment member 12 is formed in a column shape which is disposed so as to be coaxial with the axis line O.

The elastic body 13 is bonded to each of an inner circumferential surface of a first end portion of the first attachment member 11 and an outer circumferential surface of the second attachment member 12, and closes the first end portion of the first attachment member 11.

In the first attachment member 11, a second end portion positioned on the second side in the axial direction is closed by the diaphragm 18. In addition, the liquid chamber 14 is a portion between the elastic body 13 and the diaphragm 18 in the inner portion of the first attachment member 11, and for example, the inner portion of the liquid chamber 14 is filled with the liquid L such as ethylene glycol, water, or silicone oil, and the partition member 17 is disposed in the liquid chamber 14. During input of vibration, the elastic body 13 is deformed, and an internal volume of the primary liquid chamber 15 is changed. Accordingly, a liquid pressure in the primary liquid chamber 15 is changed. The secondary liquid chamber 16 has a diaphragm 18 as a portion of a wall surface, and is expanded and contracted according to the deformation of the diaphragm 18.

As shown FIGS. 1 to 4, limiting passages 21 and 22 and flow regulation chambers 23 and 24 are provided in the partition member 17.

The limiting passages 21 and 22 communicate with the primary liquid chamber 15 and the secondary liquid chamber 16, and include the first limiting passage 21 (idle orifice) and a second limiting passage 22 (shake orifice).

The first limiting passage 21 generates liquid-column resonance with respect to input of idle vibration (for example, frequency is 18 Hz to 30 Hz, and amplitude is ±0.5 mm or less). The second limiting passage 22 generates liquid-column resonance with respect to input of shake vibration (for example, frequency is 14 Hz or less, and amplitude is greater than ±0.5 mm) having a frequency lower than that of the idle vibration.

Since a flow resistance of the first limiting passage 21 is smaller than a flow resistance of the second limiting passage 22, in a state where the primary liquid chamber 15 and the secondary liquid chamber 16 communicate with each other through the first limiting passage 21, more of the liquid L flows through the first limiting passage 21 than the second limiting passage 22.

The first limiting passage 21 and the second limiting passage 22 are independent from each other in the partition member 17, and a common channel is not used.

The second limiting passage 22 is provided on an outer circumferential portion of the partition member 17. The second limiting passage 22 includes a circumferential groove 22a, a main opening portion 22b, and an auxiliary opening portion 22c. The circumferential groove 22a is provided to extend along a circumferential direction on the outer circumferential surface of the partition member 17, and is closed from the outside in the radial direction by the inner circumferential surface of the first attachment member 11. In both end portions in the circumferential direction of the circumferential groove 22a, a first end portion communicates with the primary liquid chamber 15 through the main opening portion 22b, and the other end portion communicates with the secondary liquid chamber 16 through the auxiliary opening portion 22c.

The first limiting passage 21 is disposed further inwards in the radial direction than the second limiting passage 22 in the partition member 17. The first limiting passage 21 includes passage chambers 21a and 21b, an accommodating chamber 21c, and communication holes 21d and 21e.

A pair of passage chambers 21a and 21b is provided, and each of the passage chambers 21a and 21b configures an end portion of the first limiting passage 21. Both passage chambers 21a and 21b have the same shape and the same size due to the passage chambers 21a and 21b being inverted in the axial direction. The passage chambers 21a and 21b are formed in circular shapes in a plan view when viewed in the axial direction, and are disposed so as to be coaxial with the axis line O. In the pair of passage chambers 21a and 21b, the first passage chamber 21a positioned on the primary liquid chamber 15 side is formed in a bottomed shape which opens toward the first side in the axial direction, and the second passage chamber 21b positioned on the secondary liquid chamber 16 side is formed in a bottomed shape which opens toward the second side in the axial direction.

The accommodating chamber 21c is disposed between both passage chamber 21a and 21b, and is positioned between a bottom surface of the first passage chamber 21a and a top surface of the second passage chamber 21b. The accommodating chamber 21c is formed in a circular shape in the plan view and is disposed so as to be coaxial with the axial line O.

The communication holes 21d and 21e communicate with the passage chambers 21a and 21b and the accommodating chamber 21c. In the communication holes 21d and 21e, the first communication hole 21d which communicates with the first passage chamber 21a and the accommodating chamber 21c, and the second communication hole 21e which communicates with the second passage chamber 21b and the accommodating chamber 21c are provided.

A plurality of first communication holes 21d are disposed on the bottom surface of the first passage chamber 21a with intervals therebetween in the circumferential direction. Each of the first communication holes 21d is formed in a shape of a long-hole which extends in the circumferential direction. The plurality of first communication holes 21d are disposed so as to be rotationally symmetrical based on the axis line O in the plan view.

A plurality of second communication holes 21e are disposed on the top surface of the second passage chamber 21b with intervals therebetween in the circumferential direction. Each of the second communication holes 21e is formed in a shape of a long-hole which extends in the circumferential direction. The plurality of second communication holes 21e are disposed so as to be rotationally symmetrical based on the axis line O in the plan view.

Here, a movable plate 25 is accommodated in the accommodating chamber 21c. For example, the movable plate 25 is formed of an elastic material such as a rubber material, and is a so-called gutter-membrane which is accommodated so as to be relatively displaceable in the axial direction with respect to the partition member 17 in the accommodating chamber 21c. Aspects of displacement in the axial direction of the movable plate 25 are different from each other according to the frequency of the input vibration. The movable plate 25 is relatively displaced in the axial direction with respect to the partition member 17 so that the primary liquid chamber 15 and the secondary liquid chamber 16 communicate with each other through the accommodating chamber 21c during the input of the idle vibration, and the communication between the primary liquid chamber 15 and the secondary liquid chamber 16 through the accommodating chamber 21c is interrupted during the input of the shake vibration.

The flow regulation chambers 23 and 24 communicate with the primary liquid chamber 15 or the secondary liquid chamber 16 and the first limiting passage 21. As the flow regulation chambers 23 and 24, the first flow regulation chamber 23 which communicates with the primary liquid chamber 15 and the first limiting passage 21, and the second flow regulation chamber 24 which communicates with the secondary liquid chamber 16 and the first limiting passage 21 are provided. Both flow regulation chambers 23 and 24 are disposed so that the first limiting passage 21 is interposed therebetween in the axial direction. Both flow regulation chambers 23 and 24 communicate with each other through the first limiting passage 21, and the first limiting passage 21 is provided to extend in the axial direction between both flow regulation chambers 23 and 24.

Both flow regulation chambers 23 and 24 are formed so as to have the same shape and the same size to each other. Both flow regulation chambers 23 and 24 are formed so as to have circular shapes having larger diameters than those of the passage chambers 21a and 21b in the plan view, and are disposed so as to be coaxial with the axis line O (first attachment member 11). Both flow regulation chambers 23 and 24 are formed so as to convert the flow of the liquid L flowing into the inner portions of the flow regulation chambers 23 and 24 into a swirl flow. Both flow regulation chambers 23 and 24 convert the flow of the liquid L flowing from the primary liquid chamber 15 side into the inner portion of the flow regulation chamber 23 and the flow of the liquid L flowing from the secondary liquid chamber 16 side into the inner portion of the flow regulation chamber 24 into a swirl flow.

In the vibration damping device 10, the first flow regulation chamber 23 converts the flow of the liquid L flowing from the primary liquid chamber 15 side into the inner portion of the first flow regulation chamber 23 into a swirl flow, and the second flow regulation chamber 24 converts the flow of the liquid L flowing from the secondary liquid chamber 16 side into the inner portion of the second flow regulation chamber 24 into a swirl flow. The swirl flow in the first flow regulation chamber 23 and the swirl flow in the second flow regulation chamber 24 swirl in the circumferential direction. The swirl flow in the first flow regulation chamber 23 and the swirl flow in the second flow regulation chamber 24 swirl toward sides opposite to each other along the circumferential direction.

Flow regulation opening portions 26a and 26b and flow opening portions 27a and 27b are provided on the wall surfaces of both flow regulation chambers 23 and 24.

The flow regulation opening portions 26a and 26b are disposed on the inner circumferential surfaces of both flow regulation chambers 23 and 24, and open in the circumferential direction toward the inner portions of both flow regulation chambers 23 and 24. Each of the flow regulation opening portions 26a and 26b is provided in each of the flow regulation chambers 23 and 24. The flow regulation opening portions 26a and 26b communicate with the primary liquid chamber 15 or the secondary liquid chamber 16 through introduction paths 28a and 28b. Each of the introduction paths 28a and 28b linearly extends in a direction along an orthogonal surface orthogonal to the axis line O. Each of the introduction paths 28a and 28b extends in a tangential direction of a virtual circle which has the axis line O as a center. Both flow regulation chambers 23 and 24 convert the flow of the liquid L flowing from the flow regulation opening portions 26a and 26b into the inner portions of the flow regulation chambers 23 and 24 through the introduction paths 28a and 28b into a swirl flow by the liquid L flowing along the inner circumferential surfaces of both flow regulation chambers 23 and 24.

The flow opening portions 27a and 27b discharge the liquid L, in which the flow is converted into a swirl flow in both flow regulation chambers 23 and 24, outside of both flow regulation chambers 23 and 24. The flow opening portions 27a and 27b open in the axial direction in the flow regulation chambers 23 and 24, and are positioned further inwards in the radial direction than the flow regulation opening portions 26a and 26b. Each of the flow opening portions 27a and 27b is formed in a circular shape in the plan view, and is disposed so as to be coaxial with the axis line O. Each of the flow opening portions 27a and 27b directly communicates with the opening end portion of each of the passage chambers 21a and 21b, and has the same shape and the same size as the opening end portion and is formed so as to be coaxial with the opening end portion in plan view.

In addition, hereinafter, among the flow regulation opening portions 26a and 26b, the flow opening portions 27a and 27b, and the introduction paths 28a and 28b, the flow regulation opening portion, the flow opening portion, and the introduction path provided in the first flow regulation chamber 23 are referred to as the first flow regulation opening portion 26a, the first flow opening portion 27a, and the first introduction path 28a. Moreover, among the flow regulation opening portions 26a and 26b, the flow opening portions 27a and 27b, and the introduction paths 28a and 28b, the flow regulation opening portion, the flow opening portion, and the introduction path provided in the second flow regulation chamber 24 are referred to as the second regulation opening portion 26b, the second flow opening portion 27b, and the second introduction path 28b.

A flow velocity of the liquid L flowing into both flow regulation chambers 23 and 24 is determined by the product of an amplitude of the input vibration and a vibration frequency of the input vibration. In general, since the amplitude of the shake vibration is greater than the amplitude of the idle vibration, it is considered that the flow velocity of the liquid L generated due to the shake vibration is greater than the flow velocity of the liquid L generated due to the idle vibration.

In the vibration damping device 10, when the shake vibration is input in the axial direction, both attachment members 11 and 12 are relatively displaced while elastically deforming the elastic body 13, and the liquid pressure of the primary liquid chamber 15 is changed. According to the amplitude of the shake vibration, a large amount of liquid L per unit hour in the primary liquid chamber 15 flows into the first flow regulation chamber 23 through the first introduction path 28a and the first flow regulation opening portion 26a. That is, since the liquid L having a high flow velocity flows into the first flow regulation chamber 23 during the input of the shake vibration, in a state where the first flow regulation chamber 23 is filled with the liquid L which flows into the inner portion of the first flow regulation chamber 23, the liquid L flows into the first flow regulation chamber 23 so as to swirl. In addition, in this case, according to the amplitude of the shake vibration, a large amount of liquid L per unit hour in the secondary liquid chamber 16 flows into the second flow regulation chamber 24 through the second introduction path 28b and the second flow regulation opening portion 26b, and in a state where the second flow regulation chamber 24 is filled with the liquid L which flows into the inner portion of the second flow regulation chamber 24, the liquid L further flows into the second flow regulation chamber 24 so as to swirl.

Accordingly, since flow resistance between the primary liquid chamber 15 and the secondary liquid chamber 16 through both flow regulation chambers 23 and 24 and the first limiting passage 21 increases, the liquid L preferentially flows through the second limiting passage 22 between the primary liquid chamber 15 and the secondary liquid chamber 16, liquid column resonance is generated in the second limiting passage 22, and the shake vibration is absorbed and damped.

Moreover, in this case, even when a shake vibration having a smaller amplitude among the shake vibrations is input and it is difficult to sufficiently increase the flow resistance between the primary liquid chamber 15 and the secondary liquid chamber 16 through both flow regulation chambers 23 and 24 and the first limiting passage 21 by the swirl flows in both flow regulation chambers 23 and 24, the movable plate 25 relatively moves in the axial direction with respect to the partition member 17 in the accommodating chamber 21c so as to come into contact with the wall surface of the accommodating chamber 21c and close the communication holes 21d and 21e. Accordingly, the liquid L flowing through the first limiting passage 21 is restricted. In addition, for example, the movable plate 25 may alternately close the first communication hole 21d and the second communication hole 21e, and may continuously close one of the first communication hole 21d and the second communication hole 21e.

Meanwhile, if the idle vibration is input in the axial direction, as described above, when the liquid pressure in the primary liquid chamber 15 is changed, a small amount of liquid L flows into both flow regulation chambers 23 and 24 according to the amplitude of the idle vibration. Accordingly, the flow regulation chambers 23 and 24 are not filled with the liquid L flowing into the inner portions of the flow regulation chambers 23 and 24, and the liquid L flowing into both flow regulation chambers 23 and 24 does not swirl or flows with a small amount of swirl. As a result, the flow resistance between the primary liquid chamber 15 and the secondary liquid chamber 16 through both flow regulation chambers 23 and 24 and the first limiting passage 21 is suppressed such that it is lowered. In addition, the movable plate 25 relatively moves in the axial direction with respect to the partition member 17 in the accommodating chamber 21c so as to separate from the wall surface of the accommodating chamber 21c and to open the communication holes 21d and 21e, and the primary liquid chamber 15 and the secondary liquid chamber 16 communicate with each other through the first limiting passage 21. In addition, in this case, for example, in a state where the movable plate 25 is separated from the inner surface of the accommodating chamber 21c, the movable plate 25 may alternately be displaced to both sides in the axial direction.

Accordingly, more of the liquid L can flow to the first limiting passage 21 through the introduction paths 28a and 28b, the flow regulation opening portions 26a and 26b, and the flow opening portions 27a and 27b, resonance is generated in the first limiting passage 21, and the idle vibration is absorbed and damped.

As described above, according to the vibration damping device 10 of the present embodiment, by providing both flow regulation chambers 23 and 24 instead of the plunger member of the related art, it is possible to absorb and damp both of the shake vibration and the idle vibration, and it is possible to achieve simplification of the structure of the vibration damping device 10 and facilitation of manufacture thereof.

In addition, both flow regulation chambers 23 and 24 convert each of the flow of the liquid L flowing from the primary liquid chamber 15 side into the inner portion of the flow regulation chamber 23 and the flow of the liquid L flowing from the secondary liquid chamber 16 side into the inner portion of the flow regulation chamber 24 into a swirl flow. Accordingly, it is possible to restrict both of the liquid L in the primary liquid chamber 15 flowing to the secondary liquid chamber 16 through both flow regulation chambers 23 and 24 and the first limiting passage 21 and the liquid L in the secondary liquid chamber 16 flowing to the primary liquid chamber 15 through both flow regulation chambers 23 and 24 and the first limiting passage 21, during the input of the shake vibration. As a result, the liquid L can more preferentially flow through the second limiting passage 22.

In addition, the first flow regulation chamber 23 converts the flow of the liquid L flowing from the primary liquid chamber 15 side into the inner portion of the first flow regulation chamber 23 into a swirl flow, and the second flow regulation chamber 24 converts the flow of the liquid L flowing from the secondary liquid chamber 16 side into the inner portion of the second flow regulation chamber 24 into a swirl flow. Accordingly, it is possible to prevent the liquid L in the primary liquid chamber 15 and the secondary liquid chamber 16 from reaching the first limiting passage 21 during the input of the shake vibration, and it is possible to reliably absorb and damp the shake vibration.

Moreover, by the simple configuration in which the aspects of the displacement of the movable plate 25 in the axial direction are different from each other according to the frequencies of the input vibrations, the liquid L flowing to the primary liquid chamber 15 and the secondary liquid chamber 16 through the first limiting passage 21 can be restricted during the input of the shake vibration. Accordingly, even when a shake vibration having a smaller amplitude among the shake vibrations is input and it is difficult to sufficiently increase the flow resistance between the primary liquid chamber 15 and the secondary liquid chamber 16 through both flow regulation chambers 23 and 24 and the first limiting passage 21 by the swirl flows in both flow regulation chambers 23 and 24, the liquid L flowing through the first limiting passage 21 can be restricted. As a result, the liquid L can reliably flow through the second limiting passage 22.

Moreover, since both flow regulation chambers 23 and 24 convert the flow of the liquid L flowing from the flow regulation opening portions 26a and 26b into the inner portions of the flow regulation chambers 23 and 24 into a swirl flow by the liquid L flowing along the inner circumferential surfaces of both flow regulation chambers 23 and 24, it is possible to reliably convert the flow of the liquid L into the swirl flow with a simple configuration.

In addition, the flow opening portions 27a and 27b open into both flow regulation chambers 23 and 24 in the axial direction, and are positioned further inwards in the radial direction than the flow regulation opening portions 26a and 26b. Accordingly, it is possible to retain the liquid L in both flow regulation chambers 23 and 24 over a long time until the liquid L, in which the flow is converted into a swirl flow in both flow regulation chambers 23 and 24, is discharged from the flow opening portions 27a and 27b. Therefore, it is possible to reliably increase the flow resistance between the primary liquid chamber 15 and the secondary liquid chamber 16 through both flow regulation chambers 23 and 24 and the first limiting passage 21.

Moreover, in the embodiment, the accommodating chamber 21c in which the movable plate 25 is accommodated is provided in the first limiting passage 21, and the movable plate 25 may be accommodated in the accommodating chamber 21c so as to be displaceable in the axial direction of the first attachment member 11 so that the primary liquid chamber 15 and the secondary liquid chamber 16 communicate with each other through the first limiting passage 21 during the input of the idle vibration and the communication between the primary liquid chamber 15 and the secondary liquid chamber 16 through the first limiting passage 21 is interrupted during the input of the shake vibration.

In this case, during the input of the shake vibration, since the movable plate 25 is displaced in the axial direction in the accommodating chamber 21c so as to interrupt the communication between the primary liquid chamber 15 and the secondary liquid chamber 16 through the first limiting passage 21, the liquid flowing through the first limiting passage 21 is restricted by the movable plate 25, and the liquid flows through the second limiting passage 22. Meanwhile, during the input of the idle vibration, the movable plate 25 is displaced in the axial direction in the accommodating chamber 21c so that the primary liquid chamber 15 and the secondary liquid chamber 16 communicate with each other through the first limiting passage 21, and more of the liquid can flow through the first limiting passage 21.

According to the vibration damping device 10, by the simple configuration in which the aspects of the displacement of the movable plate 25 in the axial direction are different from each other according to the frequencies of the input vibrations, the liquid flowing between the primary liquid chamber 15 and the secondary liquid chamber 16 through the first limiting passage 21 can be restricted during the input of the shake vibration. Accordingly, even when a shake vibration having a smaller amplitude among the shake vibrations is input and it is difficult to sufficiently increase the flow resistance between the primary liquid chamber 15 and the secondary liquid chamber 16 through both flow regulation chambers 23 and 24 and the first limiting passage 21 by the swirl flows in both flow regulation chambers 23 and 24, the liquid flowing through the first limiting passage 21 can be restricted, and the liquid can reliably flow through the second limiting passage 22.

Moreover, in the embodiment, both flow regulation chambers 23 and 24 may be disposed so as to be coaxial with the first attachment member 11, the flow regulation opening portions 26a and 26b which open in the circumferential direction of the first attachment member 11 toward the inner portions of both flow regulation chambers 23 and 24 may be provided on the wall surfaces of both flow regulation chambers 23 and 24, and both flow regulation chambers 23 and 24 may convert the flow of the liquid flowing from the flow regulation opening portions 26a and 26b into the inner portions of the flow regulation chambers 23 and 24 into a swirl flow by the liquid flowing along the inner circumferential surfaces of both flow regulation chambers 23 and 24.

In this case, since both flow regulation chambers 23 and 24 convert the flow of the liquid flowing from the flow regulation opening portions 26a and 26b into the inner portion of the flow regulation chambers 23 and 24 into a swirl flow by the liquid flowing along the inner circumferential surfaces of both flow regulation chambers 23 and 24, it is possible to reliably convert the flow of the liquid into the swirl flow by a simple configuration.

Moreover, a technical scope of the present invention is not limited to the embodiment, and various modifications may be added within a scope of the present invention.

For example, the movable plates 25 and the introduction paths 28a and 28b may be omitted.

In addition, in the embodiment, each of the flow regulation opening portions 26a and 26b is provided in each of the flow regulation chambers 23 and 24. However, the present invention is not limited to this. For example, a plurality of flow regulation opening portions may be provided in each of the flow regulation chambers.

Moreover, in the embodiment, the first flow regulation chamber 23 which communicates with the primary liquid chamber 15 and the first limiting passage 21 converts the flow of the liquid L flowing from the primary liquid chamber 15 side into the inner portion of the first flow regulation chamber 23 into a swirl flow. However, the present invention is not limited to this. For example, the first flow regulation chamber which communicates with the primary liquid chamber and the first limiting passage may convert the flow of the liquid flowing from the secondary liquid chamber side into the inner portion of the first flow regulation chamber into a swirl flow.

Moreover, in the embodiment, the second flow regulation chamber 24 which communicates with the secondary liquid chamber 16 and the first limiting passage 21 converts the flow of the liquid L flowing from the secondary liquid chamber 16 side into the inner portion of the second flow regulation chamber 24 into a swirl flow. However, the present invention is not limited to this. For example, the second flow regulation chamber which communicates with the secondary liquid chamber and the first limiting passage may convert the flow of the liquid flowing from the primary liquid chamber side into the inner portion of the second flow regulation chamber into a swirl flow.

Moreover, in the embodiment, both flow regulation chambers 23 and 24 include the first flow regulation chamber 23 and the second flow regulation chamber 24. However, the present invention is not limited to this. For example, only the first flow regulation chamber may be provided, or only the second flow regulation chamber may be provided. That is, the flow regulation chamber may be appropriately modified to another configuration which converts the flow of the liquid flowing into the inner portion of the flow regulation chamber during the input of the shake vibration into a swirl flow.

In addition, in the embodiment, the vibration damping device 10 is applied to the configuration in which a positive pressure acts on the primary liquid chamber 15 based on a support load. However, the present invention is not limited to this, and for example, the vibration damping device 10 may be applied to a configuration in which a negative pressure acts on the primary liquid chamber based on a support load.

Moreover, in the embodiment, the first attachment member 11 is connected to the vibration receiving portion, and the second attachment member 12 is connected to the vibration generating portion. However, the present invention is not limited to this. For example, the first attachment member may be connected to the vibration generating portion, and the second attachment member may be connected to the vibration receiving portion.

In addition, in the embodiment, as shown in FIG. 1, the primary liquid chamber 15 and the secondary liquid chamber 16 have structures different from each other. However, the present invention is not limited to this, and the primary liquid chamber 15 and the secondary liquid chamber 16 may have the same structure to each other. That is, in the embodiment, both flow regulation chambers 23 and 24 may be formed so as to have the same shape and the same size to each other. Similarly to this, the primary liquid chamber 15 and the secondary liquid chamber 16 may have the same shape and the same size to each other.

In addition, the vibration damping device 10 according to the present invention is not limited to an engine mount of a vehicle, and may be applied to a location other than an engine mount. For example, the vibration damping device 10 may be applied to a mount of a generator mounted on a construction machine, or may be applied to a mount of a machine installed in a factory or the like.

Moreover, components of the embodiment may be appropriately replaced by well-known components within a scope of the present invention, and the above-described modified examples may be appropriately combined.

INDUSTRIAL APPLICABILITY

According to a vibration damping device of the present invention, it is possible to achieve simplification of a structure and facilitation of manufacturing.

REFERENCE SIGNS LIST

10: vibration damping device
11: first attachment member
12: second attachment member
13: elastic body
14: liquid chamber
15: primary liquid chamber
16: secondary liquid chamber
17: partition member
21: first limiting passage
22: second limiting passage
23: first flow regulation chamber
24: second flow regulation chamber
25: movable plate
26a and 26b: flow regulation opening portion
27a and 27b: flow opening portion
L: liquid

The invention claimed is:

1. A vibration damping device, comprising:
a first cylindrical attachment member which is connected to one of a vibration generating portion and a vibration receiving portion, and a second attachment member which is connected to the other thereof;
an elastic body which connects both attachment members; and
a partition member which divides a liquid chamber, in which a liquid is sealed and which is positioned within the first attachment member, into a primary liquid chamber having the elastic body as a portion of a wall surface, and into a secondary liquid chamber;
wherein a limiting passage which communicates with the primary liquid chamber and the secondary liquid chamber is formed in the partition member;
wherein the limiting passage includes:
a first limiting passage which generates resonance with respect to input of idle vibration, the first limiting passage including:
a passage chamber;
an accommodating chamber;
a movable plate provided in the accommodating chamber; and
an communication hole; and
a second limiting passage which generates resonance with respect to input of shake vibration,
wherein a flow regulation chamber which communicates with the primary liquid chamber or the secondary liquid chamber and the first limiting passage is provided in the partition member, and
wherein the flow regulation chamber converts the flow of the liquid, which flows into the flow regulation chamber during the input of the shake vibration, into a swirl flow,
wherein the passage chamber is disposed between the accommodating chamber and the flow regulation chamber along an axial direction of the vibration damping device,
wherein the first limiting passage communicates with the primary liquid chamber through the flow regulation chamber,
wherein the communication hole communicates with the passage chamber and the accommodating chamber, and
wherein the communication hole is disposed between the passage chamber and the accommodating chamber along the axial direction of the vibration damping device.

2. The vibration damping device according to claim 1, wherein the flow regulation chamber converts each of the flow of the liquid flowing from the primary liquid chamber side into the flow regulation chamber and the flow of the liquid flowing from the secondary liquid chamber side into the flow regulation chamber into a swirl flow.

3. The vibration damping device according to claim 2, wherein the flow regulation chamber includes,
a first flow regulation chamber which communicates with the primary liquid chamber and the first limiting passage, and converts the flow of the liquid flowing from the primary liquid chamber side into the first flow regulation chamber into a swirl flow; and
a second flow regulation chamber which communicates with the secondary liquid chamber and the first limiting passage, and converts the flow of the liquid flowing from the secondary liquid chamber side into the second flow regulation chamber into a swirl flow.

4. The vibration damping device according to claim 1, wherein the movable plate is accommodated in the accommodating chamber to be displaceable in the axial direction of the first attachment member so that the primary liquid chamber and the secondary liquid chamber communicate with each other through the first limiting passage during the input of the idle vibration and the communication between the primary liquid chamber and the secondary liquid chamber through the first limiting passage during the input of the shake vibration is interrupted.

5. The vibration damping device according to claim 1, wherein the flow regulation chamber is disposed to be coaxial with the first attachment member;
wherein a flow regulation opening portion, which opens in a circumferential direction of the first attachment member toward the inner portion of the flow regulation chamber, is provided on a wall surface of the flow regulation chamber; and
wherein the flow regulation chamber converts the flow of the liquid flowing from the flow regulation opening portion into the flow regulation chamber into a swirl flow by the liquid flowing along an inner circumferential surface of the flow regulation chamber.

6. The vibration damping device according to claim 4, wherein the flow regulation chamber is disposed to be coaxial with the first attachment member;
wherein a flow regulation opening portion, which opens in a circumferential direction of the first attachment member toward the inner portion of the flow regulation chamber, is provided on a wall surface of the flow regulation chamber; and
wherein the flow regulation chamber converts the flow of the liquid flowing from the flow regulation opening portion into the flow regulation chamber into a swirl flow by the liquid flowing along an inner circumferential surface of the flow regulation chamber.

7. The vibration damping device according to claim 5, wherein a flow opening portion which discharges the liquid, in which the flow is converted into a swirl flow in the flow regulation chamber, outside of the flow regulation chamber is provided on the wall surface of the flow regulation chamber; and
wherein the flow opening portion opens in the axial direction of the first attachment member in the flow regulation chamber, and is positioned further inwards in a radial direction of the first attachment member than the flow regulation opening portion.

8. The vibration damping device according to claim 6, wherein a flow opening portion which discharges the liquid, in which the flow is converted into a swirl flow in the flow regulation chamber, outside of the flow regulation chamber is provided on the wall surface of the flow regulation chamber; and
wherein the flow opening portion opens in the axial direction of the first attachment member in the flow regulation chamber, and is positioned further inwards in a radial direction of the first attachment member than the flow regulation opening portion.

9. The vibration damping device according to claim 1, wherein the flow regulation chamber includes:
an introduction path through which the liquid enters the flow regulation chamber; and
a circular path connected to the introduction path which converts the flow of the liquid flowing into the swirl flow.

10. The vibration damping device according to claim 9, wherein the circular path directly communicates with the introduction path and the limiting passage.

11. The vibration damping device according to claim 9, wherein the introduction path has a linear shape and connects with an outer surface of the circular path in a tangential direction of the outer surface.

12. The vibration damping device according to claim 10, wherein the introduction path has a linear shape and connects with an outer surface of the circular path in a tangential direction of the outer surface.

13. The vibration damping device according to claim 1, wherein the first limiting passage communicates with the primary liquid chamber only through the flow regulation chamber.

14. The vibration damping device according to claim 1, wherein a width of the passage chamber is smaller than a width of the flow regulation chamber in a radial direction of the vibration damping device.

* * * * *